United States Patent
Wolford et al.

[11] 3,917,642
[45] Nov. 4, 1975

[54] BROMINATED TRICYCLIC IMIDE FLAME RETARDANTS

[75] Inventors: Lionel T. Wolford; Jack Newcombe, both of Freehold; Anderson O. Dotson, Jr., Somerset, all of N.J.

[73] Assignee: Cities Service Company, Tulsa, Okla.

[22] Filed: May 11, 1973

[21] Appl. No.: 359,283

Related U.S. Application Data

[63] Continuation-in-part of Ser. No. 200,615, Nov. 19, 1971, abandoned.

[52] U.S. Cl..... 260/326 C; 260/DIG. 24; 106/15 FP
[51] Int. Cl.$^2$................ C07D 209/76; C07D 405/14
[58] Field of Search ................................. 260/326 C

[56] References Cited
UNITED STATES PATENTS

| | | | |
|---|---|---|---|
| 3,574,230 | 4/1971 | Cyba | 260/326 |
| 3,748,340 | 7/1973 | Hayes | 260/326 |

*Primary Examiner*—Donald G. Daus
*Assistant Examiner*—Mark L. Berch
*Attorney, Agent, or Firm*—Patricia J. Hogan

[57] ABSTRACT

Novel compounds, useful as flame retardants for normally flammable organic polymers, correspond to the formula:

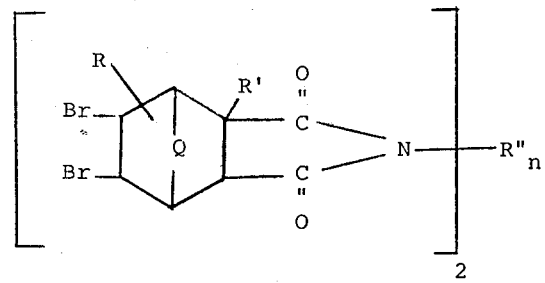

wherein Q is methylene or oxygen, R is hydrogen or an alkyl group containing 1–5 carbons, R' is hydrogen or methyl, R'' is an organic group containing 1–15 carbons, and $n$ is 0 or 1. These compounds may be prepared by synthesizing the corresponding unbrominated bisimides and subsequently brominating them.

6 Claims, No Drawings

BROMINATED TRICYCLIC IMIDE FLAME RETARDANTS

CROSS-REFERENCE TO RELATED APPLICATION

This application is a continuation-in-part of copending application Ser. No. 200,615, filed Nov. 19, 1971, now abandoned.

BACKGROUND OF THE INVENTION

1. Field of the Invention

This invention relates to novel brominated bisimides of certain Diels-Alder adducts and to processes for preparing them.

2. Description of the Prior Art

It is known that halogenated compounds are sometimes useful for imparting flame retardancy to normally flammable organic polymers. However, the halogenated compounds which have been proposed for use as flame retardants usually have one or more of the following disadvantages: volatility, toxicity, instability toward decomposition and/or discoloration at processing temperatures, incompatibility, and inefficiency.

Since some of these disadvantges make a compound less than desirable for use as a flame retardant, and others actually prevent it from having any practical utility as a flame retardant, it is apparent that there is a need for a flame retardant which is substantially non-volatile, non-toxic, stable at processing temperatures, compatible, and efficient.

It is believed that the general lack of success of the prior art in producing such a flame retardant is at least partially due to the tendency of a given factor to degrade at least one of these properties while improving another. For instance, it has been found that compounds containing (cyclo)-aliphatic bromine are sometimes more efficent than other halogenated compounds, but these compounds have poor stability at processing temperatures and frequently have other disadvantages, such as volatility, toxicity, and incompatibility. Compounds containing vinylic bromine, e.g., vinyl bromide and bromobenzene, are usually more stable but less efficient than the corresponding saturated bromohydrocarbons, and they may also be too volatile, toxic, and incompatible.

SUMMARY OF THE INVENTION

An object of this invention is to provide novel brominated organic compounds.

Another object is to provide such compounds which are useful as flame retardants and avoid the aforementioned disadvantages of many of the known halogenated flame retardants.

These and other objects are attained by providing compounds corresponding to the formula:

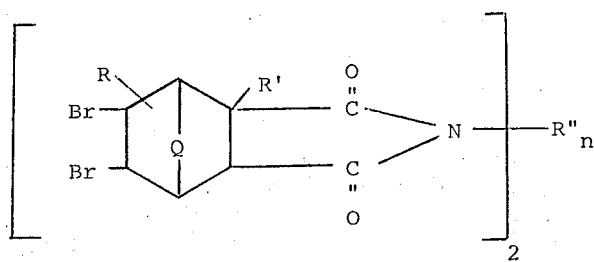

wherein Q is methylene or oxygen, R is hydrogen or an alkyl group containing 1–5 carbons, R' is hydrogen or methyl, R'' is an organic group containing 1–15 carbons, and n is 0 or 1; said compounds having bromine contents of at least about 35% by weight.

DESCRIPTION OF THE PREFERRED EMBODIMENTS

A compound of the invention may be any bisimide of the above formula wherein the bromine content satisfies the minimum requirement, although it is preferred that the bromine content be at least about 40% by weight, advantageously at least about 45% by weight. Usually the bisimides have bromine contents in the range of about 40–60% by weight.

As indicated above, the natures of Q, R, and R' of the formula are quite restricted, but there is no criticality regarding the nature of R'' other than that, when present, it be an organic group containing 1–15 carbons, preferably 1–12 carbons, which, in any given instance, does not contain too high a percentage of non-bromine elements to reduce the bromine content of the compound below about 35% by weight. Thus, e.g., R'' may be a straight-chain or branched, saturated or unsaturated, halogenated or unhalogenated (cyclo)aliphatic hydrocarbon group of 1–15 carbons, such as methylene, ethylene, vinylene, 1,2-dibromoethylene, propylene, 2,3-dibromobutylene, cyclohexylene, bromocyclohexylene, 2,3-dibromocyclohexylene, cyclohexenylene, dodecylene, 4,4'-methylenedicyclohexylene, etc.; a halogenated or unhalogenated aromatic hydrocarbon group of 1–15 carbons, such as phenylene, bromophenylene, toluylene, bromotoluylene, xylylene, bromoxylylene, etc.; a (cyclo)-aliphatic or aromatic keto group of 1–15 carbons, such as

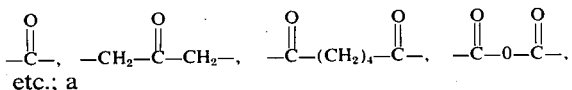

etc.; a (cyclo)aliphatic or aromatic ether group of 2–15 carbons, such as —CH$_2$—O—CH$_2$—, —CH$_2$CH$_2$—O—CH$_2$CH$_2$—, —O—O—O—, etc.; and other groups, such as aminotriazinylene,

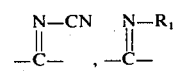

(R$_1$ being hydrogen or a (cyclo)aliphatic or aromatic hydrocarbon group of 1–6 carbons),

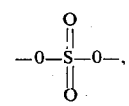

etc.

When R'' is a halogenated organic group, the halogen or halogens are usually bromine and/or chlorine.

The bisimides of the invention are conveniently prepared by (1) reacting about two molar proportions of an anhydride corresponding to the formula:

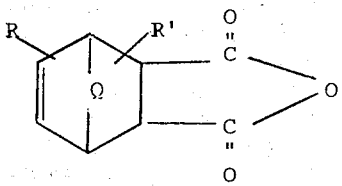

wherein Q is methylene or oxygen, R is hydrogen or an alkyl group containing 1–5 carbons, and R' is hydrogen or methyl, with one molar proportion of a diamine corresponding to the formula $H_2N$-$R''_n$-$NH_2$ wherein R'' is an organic group containing 1–15 carbons and n is 0 or 1 at temperatures of about 80°–150°C., typically in an inert organic solvent such as benzene, toluene, xylene, pentane, heptane, cyclohexane, dibutyl ether, dioxane, 1,1,2-trichloroethane, chlorobenzene, etc., and (2) reacting one molar proportion of the resultant bisimide with at least about two molar proportions of bromine at temperatures of about 0°–80°C., typically in an inert organic medium, such as an organic acid, chloroform, benzene and/or dioxane, etc.

When the bisimide of the invention is one in which n is 1 and R'' is an organic group attached to the nitrogens through primary carbons, it may also be produced by (1) reacting one molar proportion of the above anhydride with about 1–3 molar proportions of ammonia at temperatures of about 100°–150°C., (2) reacting about two molar proprtions of the resultant imide with one molar proportion of a dihalide corresponding to the formula $XCH_2R'''_nCH_2X$ wherein X is bromine, chlorine, or iodine, R''' is an organic group containing 1–13 carbon atoms, and n is 0 or 1 at temperatures of about 50°–150°C., and (3) reacting one molar proportion of the resultant bisimide with at least two molar proportions of bromine at temperatures of about 0°–80°C., typically in an inert organic medium, such as an organic acid, chloroform, benzene and/or dioxane, etc.

The bisimides of the invention are useful as flame retardants for normally flammable organic polymers, such as cotton, wool, silk, paper, natural rubber, wood, paint, and solid synthetic polymers, with which they may be compounded in any suitable manner, e.g., on a mill or in an extruder or Banbury mixer, to form compositions containing about 2–25% by weight of bisimide. As flame retardants, they have the advantages of being substantially non-volatile, non-toxic, stable toward decomposition and/or discoloration at processing temperatures, compatible, and efficient. They are also advantageous in that they are not easily leached from polypropylene carpets and the like by washing or dry cleaning.

The following examples are given to illustrate the invention and are not intended as a limitation thereof.

EXAMPLE I

Part A

Charge a suitable reaction vessel with 0.4 mole of 5-norbornene-2,3-dicarboxylic anhydride and 400cc. of toluene. Stir the reaction mixture, and add 0.2 mole of hydrazine over a period of 5 minutes. Then reflux the mixture for two hours, and recover the water of reaction. Cool the reaction mixture to room temperature and filter it. Wash the crude product twice with 150 ml. portions of water and dry it. The process results in a 91% yield of N,N'-bis(5-norbornene-2,3-dicarboximide) having a melting point of 285°–288°C.

Part B

Charge a suitable reaction vessel with 0.1 mole of the bisimide of Part A, 4 g. of sodium carbonate, and 400 cc. of chloroform. Heat the mixture to reflux, and add 0.2 mole of bromine over a period of 25 minutes. Reflux the mixture for an additional 30 minutes, cool to ambient temperature, and filter. Wash the product once with 150 cc. of chloroform and twice with 150 cc. portions of water, and then dry. The process results in a 98% yield of N,N'-bis(5,6-dibromonorbornane-2,3-dicarboximide) having a melting point of 387°–390°C., a bromine content of 48%, and a nitrogen content of 2.87%.

EXAMPLE II

Part A

Repeat Example I except for condensing 0.2 mole of the anhydride with 0.1 mole of ethylenediamine to give a 89% yield of N,N'-(1,2-ethane)-bis(5-norbornene-2,3-dicarboximide) and reacting 0.089 mole of this bisimide with 0.178 mole of bromine to give an 89% yield of N,N'-(1,2-ethane)-bis(5,6-dibromonorbornane-2,3-dicarboximide) having a melting point of 307°–310°C., a bromine content of 45.3%, and a nitrogen content of 4.1%.

EXAMPLE III

Part A

Using the procedure of Example I, Part A, condense 0.8 mole of the anhydride with 0.4 mole of 1,3-diaminopropane to give a 94% yield of N,N'-(1,3-propane)-bis(5-norbornene-2,3-dicarboximide), which has a melting point of 170°–174°C.

Part B

Simultaneously charge (1) a slurry of 0.16 mole of the bisimide of Part A in 260 ml. of a benzene/acetic acid (84/16) solvent and (2) 0.32 mole of bromine to a suitable reaction vessel containing 150 ml. of a benzene/acetic acid (84/16) solvent over a period of one hour, while maintaining the temperature at 50°C. Reflux the reaction mixture for one hour, cool to 25°C., filter, wash, and dry. The process results in a 90% yield of N,N'-(1,3-propane)-bis(5,6-dibromonorbornane-2,3-dicarboximide) having a melting point of 287°–290°C. and a bromine content of 43.6%.

EXAMPLE IV

Repeat III except for substituting 1,2,-diaminopropane for 1,3-diaminopropane. The process of Part A results in a 61% yield of N,N'-(1,2-propane)-bis(5-norbornene-2,3-dicarboximide) having a melting point of 135°–140°C. The process of Part B results in a 76% yield of N,N'-(1,2-propane)-bis(5,6-dibromonorbornane-2,3-dicarboximide) having a melting point of 283°–285°C. and a bromine content of 45.7%.

EXAMPLE V

Part A

Heat a mixture of 0.6 mole of 5-norbornene-2,3-dicarboximide, 0.3 mole of 1,4-dichlorobutene-2, and 45.6 g. of potassium carbonate in 420 ml. of dimethylformamide at 120°–151°C. with stirring for 4 hours, cool, pour over ice, filter, wash with water, and dry. The process results in a 61% yield of N,N'-(1,4-butene- 2)-bis(5-norbornene-2,3-dicarboximide) having a melting point of 211°–222°C.

Part B

Charge a suitable reaction vessel with 0.1 mole of the bisimide of Part A, 125 ml. of chloroform, and 3.7 g. of sodium carbonate. Then add 0.3 mole of bromine at 60°–62°C. for a total reaction time of 1.5 hours. The process results in an 81% yield of N,N'-[1,4-(2,3-dibromobutyl)]-bis(5,6-dibromonorbornane-2,3-dicarboximide), a colorless solid having a melting point of 278°–281°C. After being washed with hot acetic acid, the product has a melting point of 283°–288°C. and a bromine content of 54.3.%.

EXAMPLE VI

Repeat Example II except for replacing the anhydride with 1,4-endoxo-5-cyclohexene-2,3-dicarboxylic anhydride. Similar results are observed, the final product being N,N'-(1,2-ethane)-bis(1,4-endoxo-5,6-dibromocyclohexane-2,3-dicarboximide).

Similar results are also observed when the reactants of the Examples are replaced by materials indicated to be their equivalents in the specification.

It is obvious that many variations may be made in the products and processes set forth above without departing from the spirit and scope of this invention.

What is claimed is:

1. A compound corresponding to the formula:

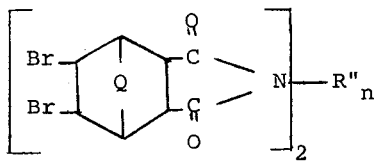

wherein Q is methylene or oxygen; R'' is methylene, ethylene, vinylene, 1,2-dibromoethylene, propylene, 2,3-dibromobutylene, cyclohexylene, bromocyclohexylene, 2,3-dibromocyclohexylene, cyclohexenylene, dodecylene, 4,4'-methylene-dicyclohexylene, phenylene, bromophenylene, toluylene, bromotoluylene, xylylene, or bromoxylylene; and $n$ is 0 or 1; said compound having a bromine content of at least about 35% by weight.

2. The compound of claim 1 corresponding to the formula:

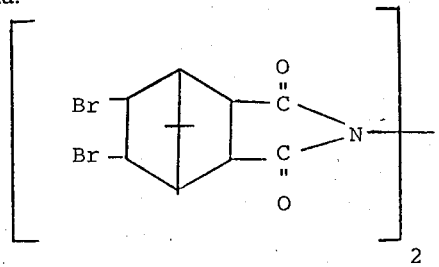

3. The compound of claim 1 corresponding to the formula:

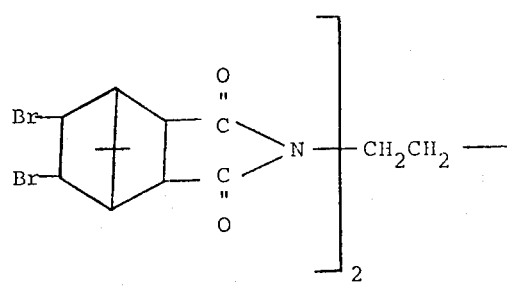

4. The compound of claim 1 corresponding to the formula:

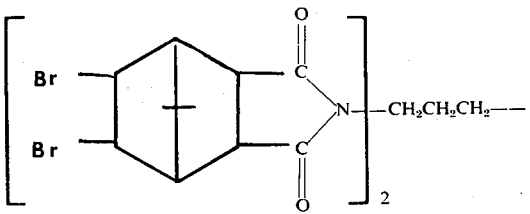

5. The compound of claim 1 corresponding to the formula:

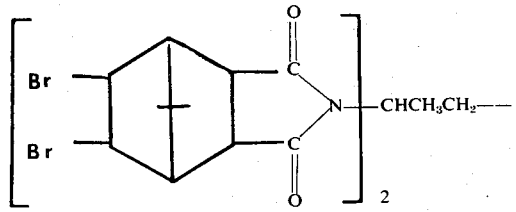

6. The compound of claim 1 corresponding to the formula:

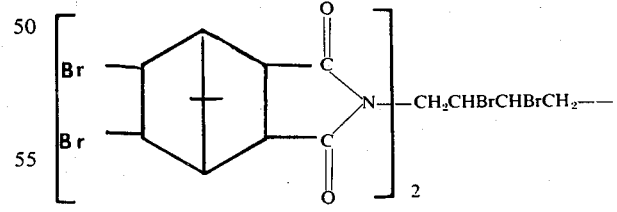

* * * * *

UNITED STATES PATENT OFFICE
CERTIFICATE OF CORRECTION

Patent No. 3917642            Dated November 4, 1975

Inventor(s) Lionel T. Wolford, J. Newcombe, A.O. Dotson, Jr.

It is certified that error appears in the above-identified patent and that said Letters Patent are hereby corrected as shown below:

Column 2, line 43 the formula reading $-\overset{O}{\underset{\parallel}{C}}-O-\overset{O}{\underset{\parallel}{C}}-$ should read -- $-\overset{O}{\underset{\parallel}{C}}-\emptyset-\overset{O}{\underset{\parallel}{C}}$ --, the formula reading "-O-O-O-" should read -- -$\emptyset$-O-$\emptyset$- --, line 53, the formula reading $-O-\overset{O}{\underset{\underset{O}{\parallel}}{S}}-O-$ should read $-\emptyset-\overset{O}{\underset{\underset{O}{\parallel}}{S}}-\emptyset-$.

Signed and Sealed this second Day of March 1976

[SEAL]

Attest:

RUTH C. MASON            C. MARSHALL DANN
*Attesting Officer*            *Commissioner of Patents and Trademarks*